United States Patent [19]

Walz

[11] Patent Number: 4,940,129
[45] Date of Patent: Jul. 10, 1990

[54] APPARATUS FOR REGROUPING ARTICLES FROM A FIRST CONVEYOR TO A SECOND CONVEYOR

[75] Inventor: Theo Walz, Neunkirch, Switzerland

[73] Assignee: SIG Schweizerische Industrie-Gesellschaft, Neuhausen am Rheinfall, Switzerland

[21] Appl. No.: 334,542

[22] Filed: Apr. 7, 1989

[30] Foreign Application Priority Data

Apr. 29, 1988 [CH] Switzerland ............... 1604/88

[51] Int. Cl.$^5$ ............................... B65G 47/40
[52] U.S. Cl. ................. 198/418.6; 198/432; 198/706
[58] Field of Search ......... 198/418.6, 432, 477.1, 198/706

[56] References Cited

U.S. PATENT DOCUMENTS

| | | | |
|---|---|---|---|
| 1,343,184 | 6/1920 | Baker et al. | 198/418.6 |
| 2,704,177 | 3/1955 | Neaves | 198/418.6 |
| 2,806,579 | 9/1957 | Marasso | 198/418.6 |
| 3,324,987 | 6/1967 | Kiesser . | |
| 3,874,495 | 4/1975 | Kemper | 198/418.6 |
| 4,410,079 | 10/1983 | Niederer et al. | 198/418.6 |
| 4,718,535 | 1/1988 | Wolff | 198/418.6 |

FOREIGN PATENT DOCUMENTS 230293 7/1987 .
657829 9/1986 Switzerland .

*Primary Examiner*—Joseph E. Valenza
*Attorney, Agent, or Firm*—Spencer & Frank

[57] ABSTRACT

A conveyor apparatus for regrouping articles from parallel-arranged first columns to form parallel-arranged second columns includes a first conveyor carrying the first columns of articles; two horizontally spaced endless carrier elements circulating in a closed path having an ascending zone extending upwardly from the first conveyor and a horizonal zone; consecutively arranged article support members extending between the two carrier elements transversely thereto and each having opposite ends pivotally supported by the carrier elements to be advanced thereby through the ascending and horizontal zones; an actuating device for pivoting the article support members into a first pivotal position to support articles and for pivoting approximately simultaneously a plurality of the article support members in the horizontal zone into a second pivotal position in which the article support members are inclined such as to cause the articles to slide off therefrom; and a second conveyor extending below the article support members situated in the horizontal zone. The second conveyor is moved in a direction perpendicular to the direction of travel of the first conveyor. The articles slide onto the second conveyor to form the second columns thereon.

11 Claims, 4 Drawing Sheets

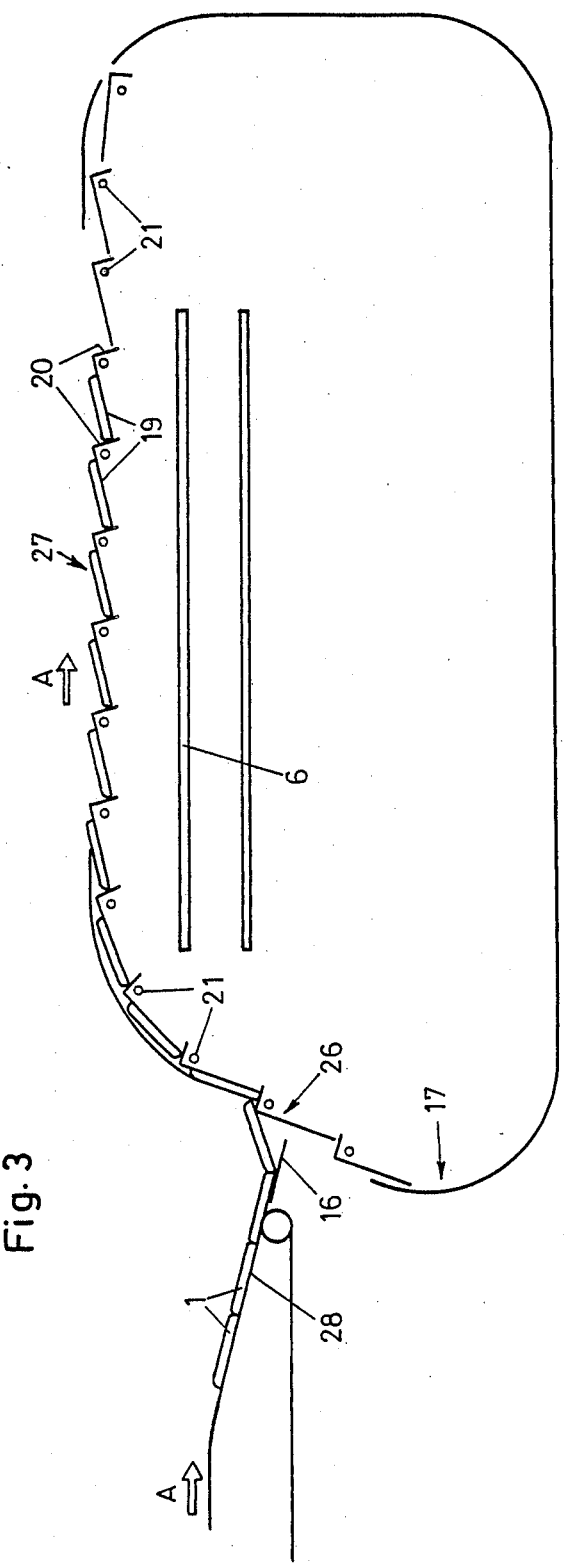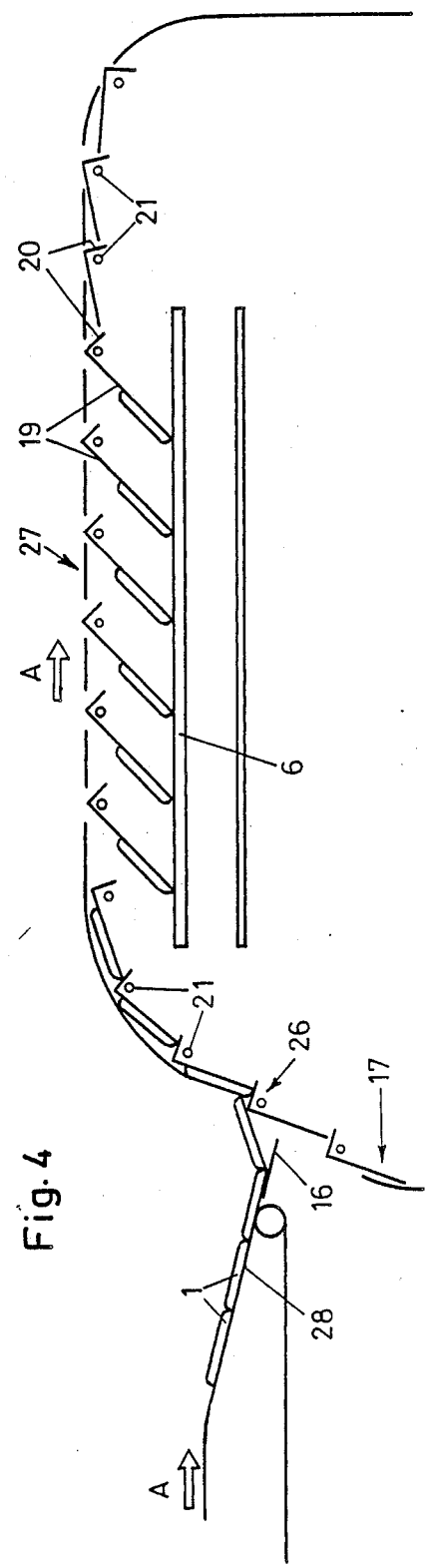

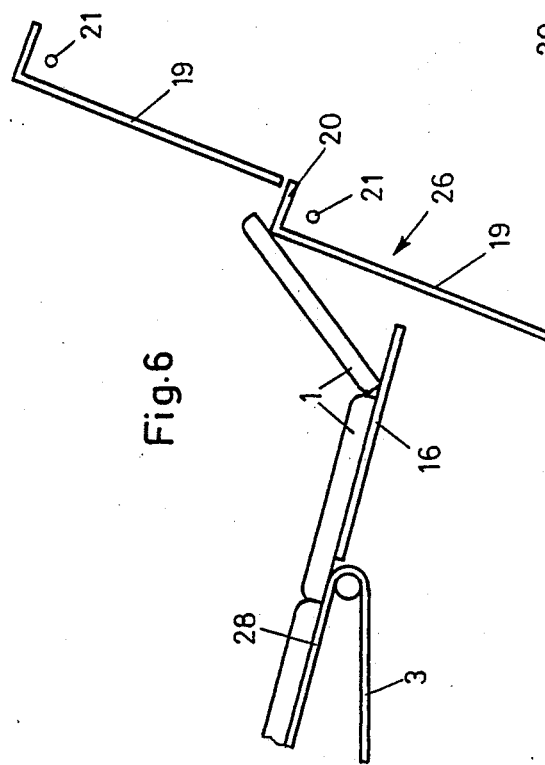
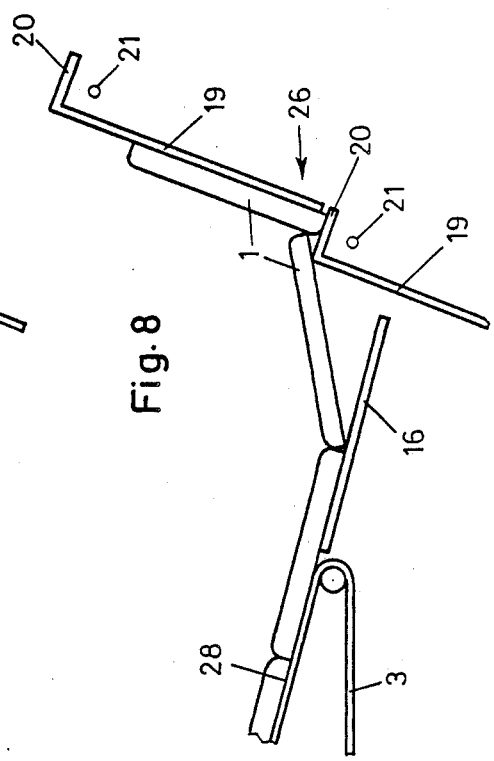
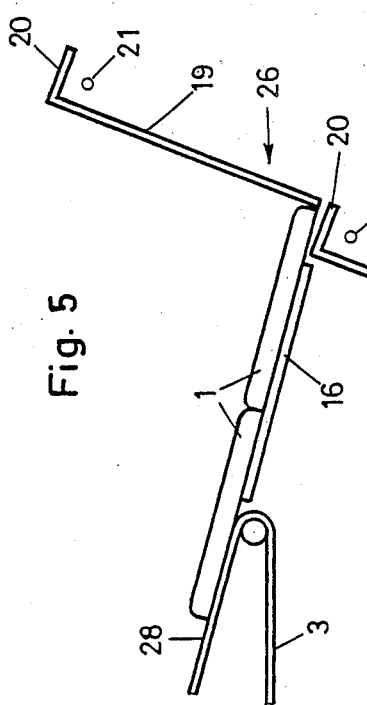
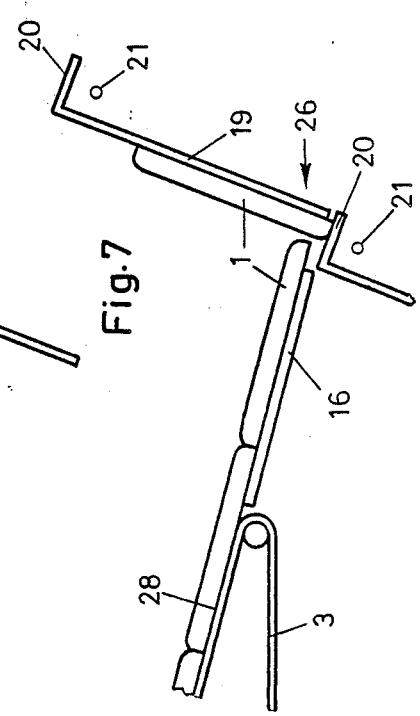

APPARATUS FOR REGROUPING ARTICLES FROM A FIRST CONVEYOR TO A SECOND CONVEYOR

BACKGROUND OF THE INVENTION

This invention relates to an apparatus for regrouping flat articles, particularly confectionery items such as biscuits or cookies from a first conveyor to a second conveyor.

In the mass manufacture of flat confectionery items, a continuous baking oven continuously discharges the baked articles in a flat-lying orientation on a conveyor belt in a large number of columns. After emerging from the baking oven, the articles are cooled and are advanced by further conveyor devices to packing machines. Upstream of the packing machines, the articles are grouped into stacks containing a predetermined number of articles. Frequently, however, differences appear between the articles forming the different columns. Thus, for example, the baked articles in the edge zones are often baked more than the others. Also, weight differences between the articles of the individual columns may occur. If the articles are packaged in small quantities, one package may contain only articles baked to a greater extent while in another package only articles baked to a lesser extent can be found, and thus the net weight may fluctuate significantly from package to package. In order to avoid such an occurrence, it is advantageous to ensure that each article stack has an article from each column.

Accordingly, European Patent Document No. 230,293 discloses an arrangement which provides that the baked articles delivered on a conveyor belt are grasped with suction grippers secured to a suction conveyor belt. Underneath the suction conveyor belt an additional conveyor belt extends transversely to the conveying direction of the first conveyor belt. When several rows of articles, held by the suction grippers, have arrived above the second conveyor belt, a plunger mechanism couples the respective suction grippers to a pneumatic pressure source, whereupon the articles drop onto the second conveyor belt. Thus, the article columns formed on the second belt are article rows on the first belt. Each column of the second belt thus receives articles from all the columns of the first belt. While by virtue of the described prior art construction a desired mixing of columns may be achieved, it is a precondition that the articles be delivered on the first conveyor belt in identical spacing which, however, is often not the case. It is a further disadvantage of the prior art arrangement that the suction and pressure device generates substantial dust clouds.

Further apparatuses for the regrouping of articles are described in U.S. Pat. No. 3,324,987 and Swiss Patent No. 657,829.

SUMMARY OF THE INVENTION

It is an object of the invention to provide an improved regrouping apparatus of the above-outlined type which operates reliably even in case the articles are supplied thereto at random spacing and which avoids a manipulation of the articles by means of suction and pressurized air.

This object and others to become apparent as the specification progresses, are accomplished by the invention, according to which, briefly stated, the conveyor apparatus for regrouping articles from parallel-arranged first columns to form parallel-arranged second columns includes a first conveyor carrying the first columns of articles; two horizontally spaced endless carrier elements circulating in a closed path having an ascending zone extending upwardly from the first conveyor and a horizontal zone; consecutively arranged article support members extending between the two carrier elements transversely thereto and each having opposite ends pivotally supported by the carrier elements to be advanced thereby through the ascending and horizontal zones; an actuating device for pivoting the article support members into a first pivotal position to support articles and for pivoting approximately simultaneously a plurality of the article support members in the horizontal zone into a second pivotal position in which the article support members are inclined such as to cause the articles to slide off therefrom; and a second conveyor extending below the article support members situated in the horizontal zone. The second conveyor is moved in a direction perpendicular to the direction of travel of the first conveyor. The articles slide onto the second conveyor to form the second columns thereon.

BRIEF DESCRIPTION OF THE DRAWING

FIGS. 3 and 4 are schematic side elevational views of the preferred embodiment illustrated in two operational positions.

FIGS. 5, 6, 7 and 8 are schematic side elevational views on an enlarged scale of a detail of the preferred embodiment shown in sequential operational positions.

DESCRIPTION OF THE PREFERRED EMBODIMENT

Figure 1:
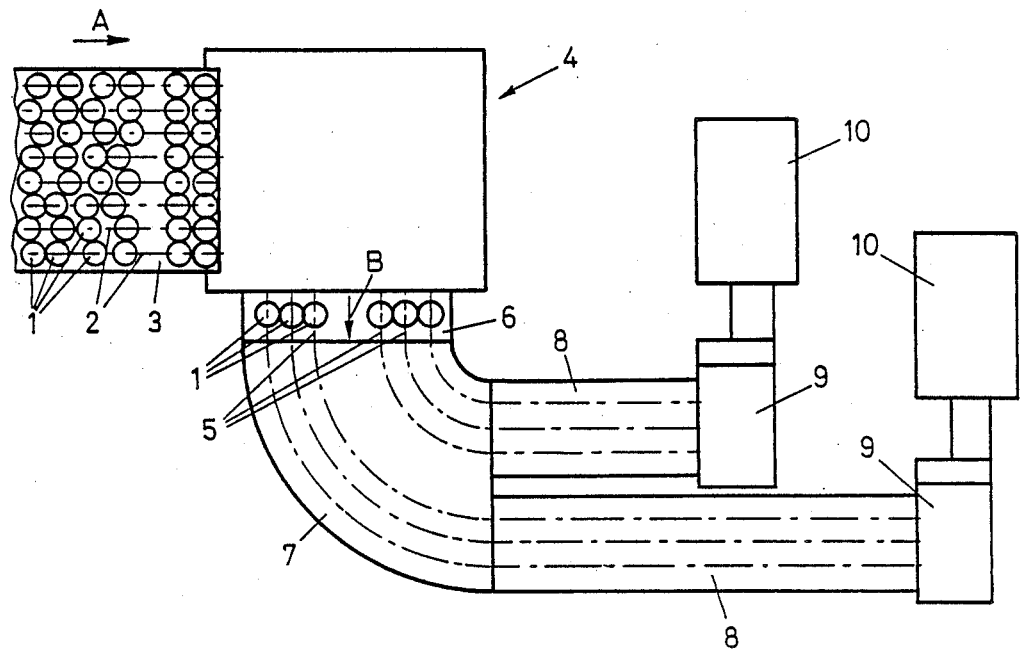
FIG. 1 is a schematic top plan view of an article conveying system incorporating the regrouping apparatus according to the invention.

Turning now to FIG. 1, from a non-illustrated continuous baking oven biscuits 1 are conveyed in a first number of columns 2 on a conveyor belt 3 in the conveying direction A to a regrouping apparatus 4. The apparatus 4 forms a second number of second columns 5 on a second conveyor belt 6 from the rows of biscuits 1 on the belt 3. The second conveyor belt 6 runs in a direction B transversely to the direction A of the conveyor belt 3. From the conveyor belt 6 the articles 1 are transferred to a curved conveyor belt 7 from which the articles are, in turn, transferred to vibratory troughs 8 in which the articles are placed in an edgewise upstanding orientation and are brought close together to be in a face-to-face adjoining position. The vibratory troughs 8 are adjoined by metering devices 9 in which article stacks containing a predetermined number of articles are formed. The article stacks are wrapped in packing machines 10.

Figure 2:
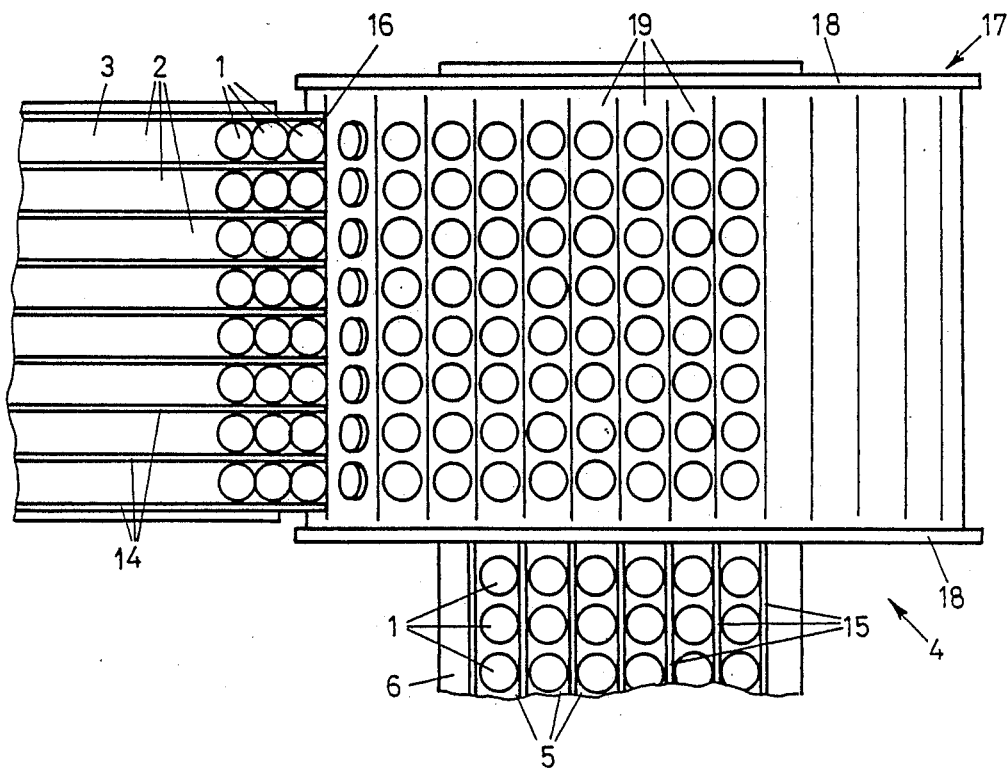
FIG. 2 is a schematic top plan view of the regrouping apparatus according to a preferred embodiment of the invention.
Figure 9:
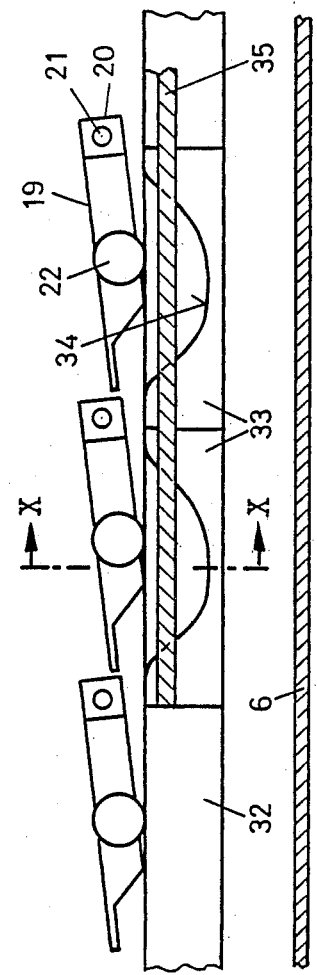
FIG. 9 is a sectional side elevational view of an enlarged detail of the preferred embodiment.

Turning now to FIG. 2, there are shown details of the apparatus 4. The individual columns 2, 5 on belts 3, 6 are separated from one another by guide plates 14, 15, respectively. Upstream of the location where articles are transferred to the regrouping apparatus 4, the articles 1 are accumulated on the conveyor belt 3 so that the articles 1 situated on a transfer plate 16 form a row and are pushed onto a revolving conveyor device 17. The latter is formed of two lateral circulating endless chains 18 to which support plates 19 are articulated at uniform distances. Each support plate terminates in outwardly projecting abutments 20 as particularly well seen in FIGS. 3–8. The abutments 20 form a continuation of the respective support plate 19, angled at 90°. The support plates are at their downstream end (as viewed in the conveying direction A) connected with the chains 18 for pivotal motion about respective horizontal pivot shafts 21. Each plate 19 has, at least on one side and at a distance from the shaft 21, a guide roller 29 (FIG. 9) which runs on a cam track to be described in more detail later.

At the location where articles are transferred from the conveyor belt 3 to the conveyor device 17, that is, in the vicinity of the transfer plate 16, the chains 18 run, in a first, ascending conveyor zone 26, obliquely upwardly then continue in a second conveyor zone 27 horizontally above the conveyor belt 6. In the zone 26 the support plates 19 are oriented obliquely upwardly and form, together with the abutments 20, a sawtooth-shaped configuration as shown in FIG. 3. In the horizontal conveyor zone 27 the plates 19 are in their base position (FIG. 3) in which they are slightly downwardly inclined in the rearward direction (as viewed in the direction of motion of the conveyor 17) so that the articles 1 positioned thereon abut the respectively subsequent abutments 20. In the zone 27 a number of plates 19, corresponding to the number of columns 5 to be formed, is simultaneously pivoted about the respective plate shaft 21 in a downward direction as indicated in FIG. 4 so that the articles 1 positioned thereon slide onto the conveyor belt 6. In order to facilitate the transfer of articles from the conveyor belt 3 to the conveyor device 17, the downstream terminal length portion 28 of the belt 3 and the plate 16 are slightly downwardly inclined at an inclination which approximately corresponds to the inclination of the abutments 20 in the zone 26 of the conveyor 17.

FIGS. 5–8 illustrate the transfer of the articles 1 from the conveyor belt 3 to the conveyor device 17 in sequential steps in the zone 26. The outwardly projecting width of the abutments 20 is significantly less than one half the distance between adjoining abutments 20 so that the leading article 1 is, by means of the stop 20 lifted only at its frontal edge as shown in FIG. 5. The subsequent article pushes the lifted articles against the subsequent support plate 19, as shown in FIG. 6. Thereafter, the next stop 20 lifts the frontal edge of the subsequent article 1, as illustrated in FIGS. 7 and 8.

Figure 10:
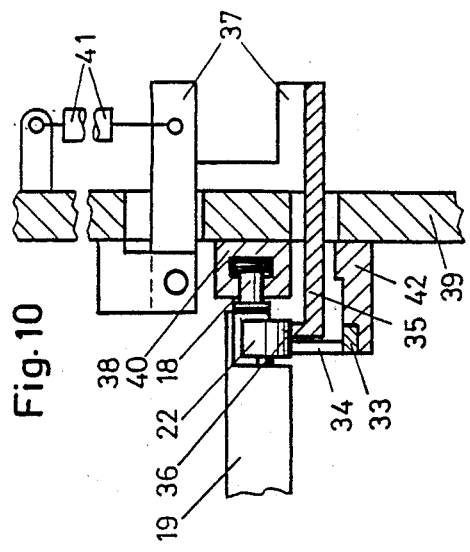
FIG. 10 is a sectional view taken along line X—X of FIG. 9.
Figure 11:
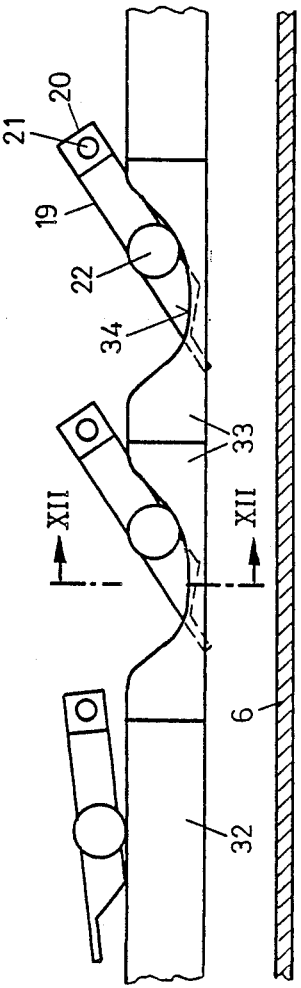
FIG. 11 is a view similar to FIG. 9, showing a different operational position.

The mechanism for lowering the support plates 19 in the conveyor zone 27 is illustrated in FIGS. 9–12. In the horizontal conveyor zone 27 the cam rail (guide rail) 32 on which the rollers 22 travel, has a plurality of insertable sections 33, whose number corresponds to the maximum number of columns 5 and whose length corresponds to the distance between adjoining pivot shafts 21 (or abutments 20). At least some of the insertable sections 33 have depressions 34 which are in alignment with respective guide plates 15 on the conveyor belt 6. As the rollers 22 travel on the track faces which define the depressions 34, the associated subsequent support plates 19 are simultaneously lowered to assume a tilted position as shown in FIG. 11 and the articles positioned thereon slide onto the conveyor belt 6.

Figure 12:
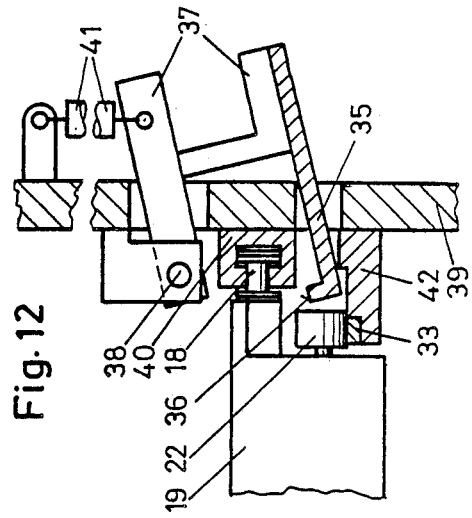
FIG. 12 is a sectional view taken along line XII—XII of FIG. 11.

After this occurrence, the conveyor device 17 has to be advanced, without lowering the plates 19, through a length which corresponds to the number of depressions 34 multiplied by the length of the sections 33, before the support plates 19 are again lowered in the conveyor zone 27. For this purpose, adjacent the sections 33 a second rail 35 is arranged which has a straight, through-going track face 36. The rail 35 is affixed to a lever 37 which, in turn, is pivotally secured to a carrier 39 by means of a horizontal pivot shaft 38, as best seen in FIGS. 10 and 12. To the carrier 39 there is affixed a horizontal guide rail 40 which supports the chain 18 and which has a straight-line configuration in the conveyor zone 27.

The lever 37 may be pivoted by means of a pneumatic cylinder 41 from its first or basic position illustrated in FIG. 10 into a second position shown in FIG. 12. In the basic position the track face 36 of the rail 35 is situated immediately adjacent the sections 33, so that the rollers 22 run, with their axially outer halves, on the track face of the second rail 35 and thus they pass over the depressions 34 in an unchanged, elevated position. In the second position of the rails 35 (FIG. 12) the rollers 22, in contradistinction, run only on the rail 32 (provided with the sections 33) and thus follow the track face portions defining the depressions 34. The frequency of the operation of the cylinder 41 is adapted to the number of the columns 5. In case of n columns 5, the cylinder 41 is actuated every time the conveyor 17 has travelled a distance equalling n times the length of a section 33.

Thus, the regrouping apparatus 4 according to the invention forms a desired number of columns 5 from a desired number of columns 2, wherein each of the columns 5 contains items from all of the columns 2. In this manner, in the packing machines 10 the net weight fluctuations of the packed stacks are maintained small and the packed articles have, in each package, approximately the same average baked condition. The apparatus 4 handles the articles 1 in a gentle manner and operates faultlessly even if the articles are delivered on the conveyor belt 3 in an unequal spacing. The number of the second columns 5 may be arbitrarily selected by replacing the sections 33 for others having a straight track face, that is, sections which have no depressions 34. For this purpose, the sections 33 may be readily removably secured to a console 42. As shown in FIG. 1, the apparatus 4 can divide the article columns 5 to feed a plurality of packing machines 10 and to adapt the ratio of column-division to the capacity of the packing machines 10. For example, one of the plurality of packing machines 10 may be a standby packing machine which is normally at a standstill and is placed into operation only upon breakdown of another, normally operating packing machine. In such a case, the rail 35 is subdivided into segments having a length which is a multiple of the length of the sections 33, and each segment has its own actuating cylinder 41.

The transverse conveyor belt 6 may be driven in either direction. When advanced in one direction, for example, the conveyor 6 may deliver articles to the packing machines and when running in the other direction, it may supply articles to a storage arrangement or a standby packing machine. If the transverse conveyor belt 6 is stopped, the articles may be advanced by the conveyor apparatus 17 into a waste container or onto another, storage conveyor belt which conveys in the advancing direction A.

It will be understood that the above description of the present invention is susceptible to various modifications, changes and adaptations, and the same are intended to be comprehended within the meaning and range of equivalents of the appended claims.

What is claimed is:

1. A conveyor apparatus for regrouping articles from parallel-arranged first columns to form parallel-arranged second columns, wherein each second column contains an article from every first column, comprising
   (a) a first conveyor moving in a first direction of advance and carrying the first columns of articles; said first conveyor having a discharge end;
   (b) two horizontally spaced endless carrier elements arranged to circulate in a closed path having an ascending zone extending upwardly and away from said discharge end of said first conveyor and a horizontal zone adjoining an upper end of said ascending zone;
   (c) consecutively arranged elongate article support members extending between the two carrier elements transversely thereto and each having opposite ends pivotally supported by respective said carrier elements to be advanced thereby through said ascending and horizontal zones; each said article support member comprising an elongate plate having a longitudinal leading edge; each said plate being pivotal relative to said carrier elements at opposite ends of said leading edge about a horizontal pivot axis;
   (d) transferring means for moving the articles from said discharge end of said first conveyor onto said article support members as said article support members travel sequentially past said discharge end;
   (e) actuating means for pivoting said article support members into a first pivotal position to support articles in said ascending zone and for pivoting approximately simultaneously a plurality of said article support members in said horizontal zone into a second pivotal position in which the article support members are inclined such as to cause the articles to slide off therefrom; the number of said plurality of article support members pivoted substantially simultaneously corresponds to the number of said second columns; said actuating means comprising
      (1) a guide roller mounted for rotation on at least one side of each said plate at a distance from a respective said horizontal pivot axis;
      (2) a first guide rail extending in the travelling direction of the plates and being supported in said horizontal zone; each said roller being arranged to run on a track face of said first guide rail; said track face of said first guide rail having linear portions and a plurality of depressions;
      (3) a second guide rail extending alongside said first guide rail and having a throughout linear track face; said second guide rail having an operative position in which the track face of the second guide rail extends alongside the depressions in alignment with the linear portions of the track face of the first guide rail for engaging each roller in zones of said depressions, whereby the rollers are prevented from dipping into the depressions; said second guide rail having a withdrawn position in which the track face of the second guide rail is moved away from said depressions allowing each roller to run on the depressions of the rack face of the second guide rail, whereby each roller dips in the zone of the depressions from a linear course, causing the respective plates to pivot from the first pivotal position into the second pivotal position; and
      (4) an actuating element connected to said second guide rail for selectively moving said second guide rail into said operative and withdrawn positions;
   (f) a second conveyor extending below said article support members situated in said horizontal zone of said carrier elements; said second conveyor being moved in a second direction parallel to said article support members and perpendicular to said first direction, whereby the articles sliding off said article support members in the second pivotal position thereof drop onto said second conveyor to form said second columns thereon; and
   (g) an abutment situated between each adjoining said article support member and extending away therefrom to a predetermined height; each said abutment travelling with said article support members and being arranged to abut a trailing edge of an article supported on a respective said article support member when in said first pivotal position; said depressions being spaced from one another at a distance corresponding to a distance between two consecutive said abutments.

2. A conveyor apparatus as defined in claim 1, further comprising means for setting the number of the approximately simultaneously pivoted plurality of article support members.

3. A conveyor apparatus for regrouping articles from parallel-arranged first columns to form parallel-arranged second columns, wherein each second column contains an article from every first column, comprising
   (a) a first conveyor moving in a first direction of advance and carrying the first columns of articles; said first conveyor having a discharge end;
   (b) two horizontally spaced endless carrier elements arranged to circulate in a closed path having an ascending zone extending upwardly and away from said discharge end of said first conveyor and a horizontal zone adjoining an upper end of said ascending zone;
   (c) consecutively arranged elongate article support members extending between the two carrier elements transversely thereto and each having opposite ends pivotally supported by respective said carrier elements to be advanced thereby through said ascending and horizontal zones; each said article support member comprising an elongate article-supporting plate having a longitudinal leading edge;
   (d) transferring means for moving the articles from said discharge end of said first conveyor onto said article support members as said article support members travel sequentially past said discharge end;
   (e) actuating means for pivoting said article support members into a first pivotal position to support articles in said ascending zone and for pivoting approximately simultaneously a plurality of said article support members in said horizontal zone into a second pivotal position in which the article support members are inclined such as to cause the articles to slide off therefrom; the number of said plurality of article support members pivoted substantially simultaneously corresponds to the number of said second columns;

(f) a second conveyor extending below said article support members situated in said horizontal zone of said carrier elements; said second conveyor being moved in a second direction parallel to said article support members and perpendicular to said first direction, whereby the articles sliding off said article support members in the second pivotal position thereof drop onto said second conveyor to form said second columns thereon; and (g) an abutment situated between each adjoining said article support member and extending away therefrom to a predetermined height; each said abutment travelling with said article support members and being arranged to abut a trailing edge of an article supported on a respective said article support member when in said first pivotal position; each said abutment comprising an abutment plate being a onepiece continuation of a respective said elongate article-supporting plate at said leading edge thereof; said abutment plate extending at an angle from the respective article-supporting plate.

4. A conveyor apparatus as defined in claim 1, wherein said predetermined height of each said abutment is less than one half of the distance between two consecutive said abutments viewed in a direction of travel thereof; the abutments being oriented in said ascending zone relative to said first conveyor such that each abutment lifts a leading article in said discharge end partially off the first conveyor for allowing a trailing article on the first conveyor to push the leading article onto a respective said support plate; said abutments forming part of said transferring means.

5. A conveyor apparatus as defined in claim 3, wherein each said elongate plate being pivotal relative to said carrier elements at opposite ends of said leading edge about a horizontal pivot axis.

6. A conveyor apparatus as defined in claim 3, wherein each said plate has opposite sides spaced transversely to the travelling direction thereof; said actuating means comprising (a) a guide roller mounted for rotation on at least one side of each said plate at a distance from a respective said horizontal pivot axis;

(b) a first guide rail extending in the travelling direction of the plates and being supported in said horizontal zone; each said roller being arranged to run on a track face of said first guide rail; said track face of said first guide rail having linear portions and a plurality of depressions spaced from one another at a distance corresponding to a distance between two consecutive said abutments;

(c) a second guide rail extending alongside said first guide rail and having a throughout linear track face; said second guide rail having an operative position in which the track face of the second guide rail extends alongside the depressions in alignment with the linear portions of the track face of the first guide rail for engaging each roller in zones of said depressions, whereby the rollers are prevented from dipping into the depressions; said second guide rail having a withdrawn position in which the track face of the second guide rail is moved away from said depressions allowing each roller to run on the depressions of the track face of the second guide rail, whereby each roller dips in the zone of the depressions from a linear course, causing the respective plates to pivot from the first pivotal position into the second pivotal position; and (d) an actuating element connected to said second guide rail for selectively moving said second guide rail into said operative and withdrawn positions.

7. A conveyor apparatus as defined in claim 6, wherein said first guide rail comprises a plurality of replaceable length portions each including at least one of said depressions.

8. A conveyor apparatus as defined in claim 3, wherein said angle is approximately 90°.

9. A conveyor apparatus as defined in claim 3, further comprising means for setting the number of the approximately simultaneously pivoted plurality of article support members.

10. A conveyor apparatus as defined in claim 3, wherein said predetermined height of each said abutment is less than one half of the distance between two consecutive said abutments viewed in a direction of travel thereof; the abutments being oriented in said ascending zone relative to said first conveyor such that each abutment lifts a leading article in aid discharge end partially off the first conveyor for allowing a trailing article on the first conveyor to push the leading article onto a respective said support plate; said abutments forming part of said transferring means.

11. A conveyor apparatus as defined in claim 1, wherein said first guide rail comprises a plurality of replaceable length portions each including at least one of said depressions.

* * * * *